(12) United States Patent
Wu et al.

(10) Patent No.: US 11,603,012 B2
(45) Date of Patent: Mar. 14, 2023

(54) CONTROLLER, ELECTRIC POWER SYSTEM COMPRISING THE CONTROLLER, METHOD OF OPERATING THE SYSTEM, AND VEHICLE COMPRISING THE SYSTEM

(71) Applicant: GRABTAXI HOLDINGS PTE. LTD., Singapore (SG)

(72) Inventors: Xihu Wu, Beijing (CN); He Zhang, Beijing (CN); Lei Jiang, Beijing (CN); Yi Zheng, Kirkland, WA (US)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/611,066

(22) PCT Filed: Jul. 7, 2020

(86) PCT No.: PCT/SG2020/050385
§ 371 (c)(1),
(2) Date: Nov. 12, 2021

(87) PCT Pub. No.: WO2021/054892
PCT Pub. Date: Mar. 25, 2021

(65) Prior Publication Data
US 2022/0258648 A1 Aug. 18, 2022

(30) Foreign Application Priority Data
Sep. 20, 2019 (CN) .......................... 201910894637.2

(51) Int. Cl.
*B60L 58/18* (2019.01)
*B60L 58/12* (2019.01)
(Continued)

(52) U.S. Cl.
CPC .............. *B60L 58/18* (2019.02); *B60L 53/80* (2019.02); *B60L 58/12* (2019.02);
(Continued)

(58) Field of Classification Search
None
See application file for complete search history.

(56) References Cited

U.S. PATENT DOCUMENTS

| 6,064,178 A | 5/2000 | Miller |
| 2011/0234006 A1 | 9/2011 | Deng et al. |

(Continued)

FOREIGN PATENT DOCUMENTS

| CN | 106953391 A | | 7/2017 |
| JP | 2015050913 A | * | 3/2015 |

(Continued)

OTHER PUBLICATIONS

Micah Toll, "Gogoro heats up electric scooter battery swap war with new battery and scooter partners"; electrek, Oct. 17, 2018, https://electrek.co/2018/10/17/gogoro-electric-scooter-battery.

M. Locklear, "Lyft will add Segway scooters with swappable batteries 'soon'"; engadget, Jan. 10, 2019, https://www.engadget.com/2019-01-10-lyft-segway-scooters-swappable-batteries.

(Continued)

*Primary Examiner* — Abdhesh K Jha
(74) *Attorney, Agent, or Firm* — Nixon Peabody LLP; Jeffrey L. Costellia

(57) ABSTRACT

An electric power system for an electric vehicle, including: first charging and discharging current paths connected to a first battery unit; second charging and discharging current paths connected to a second battery unit; third charging and discharging current paths for a connection with an electric control system of the vehicle; a first power switch between the first discharging current path and the third discharging current path; a second power switch between the second discharging current path and the third discharging current path; a controlling unit to set the first and second power switches based on states of the accumulators, at least one of (Continued)

the first and second battery units being swappable. A controller, a method, and a vehicle comprising the system are also disclosed.

20 Claims, 4 Drawing Sheets

(51) Int. Cl.
    *B60L 53/80*     (2019.01)
    *H01M 10/42*     (2006.01)
    *H01M 10/44*     (2006.01)
    *H02J 7/00*     (2006.01)

(52) U.S. Cl.
    CPC ....... *H01M 10/425* (2013.01); *H01M 10/441* (2013.01); *H02J 7/0013* (2013.01); *H01M 2220/20* (2013.01)

(56) References Cited

U.S. PATENT DOCUMENTS

| | | |
|---|---|---|
| 2014/0091751 A1 | 4/2014 | Workman et al. |
| 2017/0163060 A1 | 6/2017 | Zheng et al. |
| 2018/0109133 A1 | 4/2018 | Wei et al. |

FOREIGN PATENT DOCUMENTS

| | | |
|---|---|---|
| KR | 10-1934702 B1 | 1/2019 |
| WO | WO-2019/010126 A1 | 1/2019 |

OTHER PUBLICATIONS

Megan Rose Dickey, "Skip unveils scooters with cameras and locks"; TC, Dec. 18, 2018, https://techcrunch.com/2018/12/18/skip-unveils-scooters-with-locks-and-cameras.

CUI Xiudong, "Battery Pack Balancing Systems For Underground Mine Electric Vehicles", 2017; 190 pp., https://researchbank.swinburne.edu.au/file/4aa63338-50b3-4d86-8da8-eb00cf4e45ea/1/xiudong_cui_thesis.pdf.

Daowd Mohamed et al., "Capacitor Based Battery Balancing System", EVS26 International Battery, Hybrid and Fuel Cell Electric Vehicle Symposium, May 6-9, 2012, pp. 0385 to 0393, World Electric Vehicle Journal vol. 5, https://www.mdpi.com/2032-6653/5/2/385/pdf.

Arendarik Stanislav, "Active Cell Balancing in Battery Packs", Freescale Semiconductor Application Note, Jan. 2012; 8 pp., Freescale Semiconductor, Inc., http://cache.freescale.com/files/32bit/doc/app_note/AN4428.pdf.

International Search Report (Application No. PCT/SG2020/050385) dated Oct. 13, 2020.

Written Opinion (Application No. PCT/SG2020/050385) dated Oct. 13, 2020.

\* cited by examiner

CONTROLLER, ELECTRIC POWER SYSTEM COMPRISING THE CONTROLLER, METHOD OF OPERATING THE SYSTEM, AND VEHICLE COMPRISING THE SYSTEM

TECHNICAL FIELD

Various aspects of this disclosure relate to an electric power system for a vehicle, to method of operating the electric power system, to a battery controller for the electric power system, and to vehicle comprising the electric power system.

BACKGROUND

Vehicles, such as an electric scooter, may include a battery for providing power and an electric circuit for controlling power of a motor and the respective discharging of the battery, and further for controlling charge of the battery. When more than one battery is employed, the batteries may have different charge states and when all are in discharging mode, current may flow from one battery to the other, wasting energy and reducing a use life of the batteries.

Therefore, it is desired to provide solution for above mentioned problems.

SUMMARY

A first aspect of the disclosure concerns an electric power system for an electric vehicle.

According to various embodiments, the electric power system may include a first battery unit including a first accumulator, and a second battery unit including a second accumulator. The electric power system may further include a battery controller including first, second, and third charging paths, and may further include first, second, and third discharging paths. The first charging current path and the first discharging current path may be connected to the first battery unit. The second charging current path and the second discharging current path may be connected to the second battery unit. The third charging current path and the third discharging current path may be connected to an electric control system of the vehicle. The battery controller may further comprise a first power switch between the first discharging current path and the third discharging current path. The battery controller may further comprise a second power switch between the second discharging current path and the third discharging current path. The battery controller may further comprise a controlling unit configured to set the first power switch and the second power switch based on a state of the first accumulator in the first battery unit and/or a state of the second accumulator in the second battery unit. The first battery unit may be a swappable battery unit. The second battery unit may be a swappable battery unit.

According to various embodiments, the controlling unit may include a logic circuit configured to regulate a charging behavior of the first accumulator and the second accumulator.

According to various embodiments, when charging, the logic circuit may be configured to determine a lower charge state and a higher charge state among the first accumulator and the second accumulator. When charging, the logic circuit may be configured to send a charge enable command to that battery unit of the first and second battery units having the lower charge state. When charging, the logic circuit may be configured to send a charge enable command to that battery unit of the first and second battery units having the higher charge state, when a difference of the higher charge state and the lower charge state is lower than a pre-determined charging threshold (for example 0.5% charge difference, or 0.5% of the maximum nominal charging value).

According to various embodiments, when discharging, the controlling unit may be configured to determine a lower charge state and a higher charge state among the first accumulator and the second accumulator. When discharging, the logic circuit may be configured to close the one of the first power switch and the second power switch corresponding to the one of the first accumulator and the second accumulator having the higher charge state. When discharging, the logic circuit may be configured to open the one of the first power switch and the second power switch corresponding to the one the first accumulator and the second accumulator having the lower charge state when a difference of the higher charge state and the lower charge state is higher than a pre-determined discharging threshold (for example 0.5% charge difference, or 0.5% of the maximum nominal charging value).

According to various embodiments, the logic circuit may be further configured to receive a stop command from the electric control system and, upon receiving the stop command, setting each of the first power switch and the second power switch to open.

According to various embodiments, the controlling unit may be powered via the first discharging current path via a first diode and/or via the second discharging current path via a second diode.

According to various embodiments, the first power switch and/or the second power switch are solid state switches, optionally MOS transistors.

According to various embodiments, each of the first battery and the second battery may be a swappable battery unit.

According to various embodiments, the first battery unit may include a first internal charging switch between the first accumulator and the first charging current path, and may include a first internal discharging switch between the first accumulator an the first discharging path.

According to various embodiments, the second battery unit may include a second internal charging switch between the second accumulator and the second charging current path, and may include a second internal discharging switch between the second accumulator an the second discharging path.

According to various embodiments, the controlling unit may be configured to set the first and second internal charging switches and the first and second discharging switches of the first and second battery units, for example as closed or as open.

A second aspect of the disclosure concerns a method of operating the electric power system, according to various embodiments.

According to various embodiments, the method of operating the electric power system may include setting the first power switch and the second power switch according to a charging or discharging operation mode.

According to various embodiments, when the electric control system is charging, the method may include the step of determining a lower charge state and a higher charge state among the first accumulator of the first battery unit and the second accumulator of the second battery unit.

According to various embodiments, when the electric control system is charging, the method may include the step of sending a charge enable command to that battery unit of the first and the second battery units having the lower charge state.

According to various embodiments, when the electric control system is charging, the method may include the step of sending a charge enable command to that battery unit of the first and the second battery units having the higher charge state when a difference of the higher charge state and the lower charge state is lower than a pre-determined charging threshold.

According to various embodiments, when the electric control system is discharging, the method may include the step of determining a lower charge state and a higher charge state among the first accumulator of the first battery unit and the second accumulator of the second battery unit.

According to various embodiments, when the electric control system is discharging, the method may include the step of closing the corresponding power switch of the first and second power switches corresponding to the one of the first accumulator and the second accumulator having the higher charge state.

According to various embodiments, when the electric control system is discharging, the method may include the step of opening the corresponding power switch of the first and second power switches corresponding to the one of the first accumulator and the second accumulator having the lower charge state when a difference of the higher charge state and the lower charge state is higher than a pre-determined discharging threshold.

A third aspect of the disclosure concerns a battery controller for the electric power system as described in the present disclosure, for example the electric power system including a first battery unit including a first accumulator, and a second battery unit including a second accumulator. The battery controller may include a first charging current path and a first discharging current path connectable to the first battery unit. The battery controller may include a second charging current path and a second discharging current path connectable to the second battery unit. The battery controller may include a third charging current path and a third discharging current path for a connection with an electric control system of the vehicle. The battery controller may include a first power switch between the first discharging current path and the third discharging current path. The battery controller may include a second power switch between the second discharging current path and the third discharging current path. The battery controller may include a controlling unit configured to set the first power switch and the second power switch based on a state of the first accumulator in the first battery unit and/or a state of the second accumulator in the second battery unit.

According to various embodiments, the controlling unit may be configured to set first and second internal charging switches of the first and second battery units and the first and second discharging switches of the first and second battery units.

A fourth aspect of the disclosure concerns a vehicle including the electric power system as described in the present disclosure.

According to various embodiments, the vehicle may further include an electric motor electrically coupled to the electric control system.

According to various embodiments, the vehicle may be an electric scooter.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the electric power system, the method of operating, the battery controller, or the vehicle are analogously valid for the other electric power systems, the methods of operating, the battery controllers, or the vehicles.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

As used herein, the expression "charge state" may refer to a voltage, for example a voltage of a battery may be indicative and/or proportional to a charge state of a battery. Other methods for determining charge state, than measuring a voltage, may also be implemented. Differences in charge state may be in absolute value.

According to various embodiments, details of the logic circuit also apply to the controlling unit 120, since the controlling unit 120 includes the logic circuit. The logic circuit may be implemented with digital logic for example in hardware and/or software, for example with a microcontroller. The controlling unit 120 may thus include a microcontroller.

Figure 1:
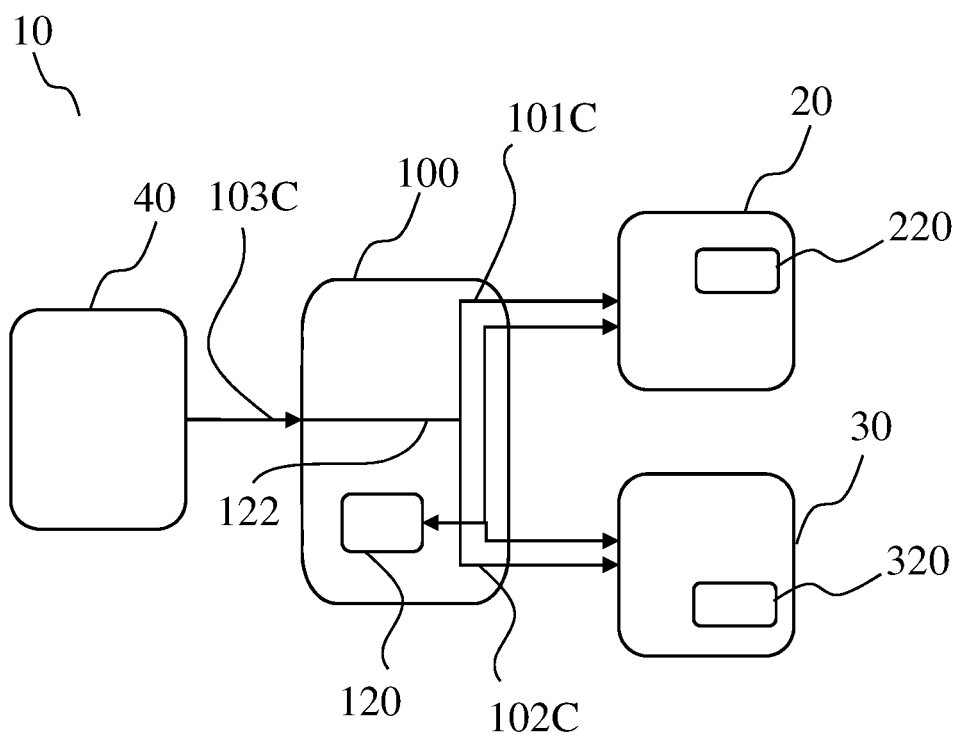
FIG. 1 shows a schematic representation of the electric power system in charging mode, in accordance with various embodiments.
Figure 2:
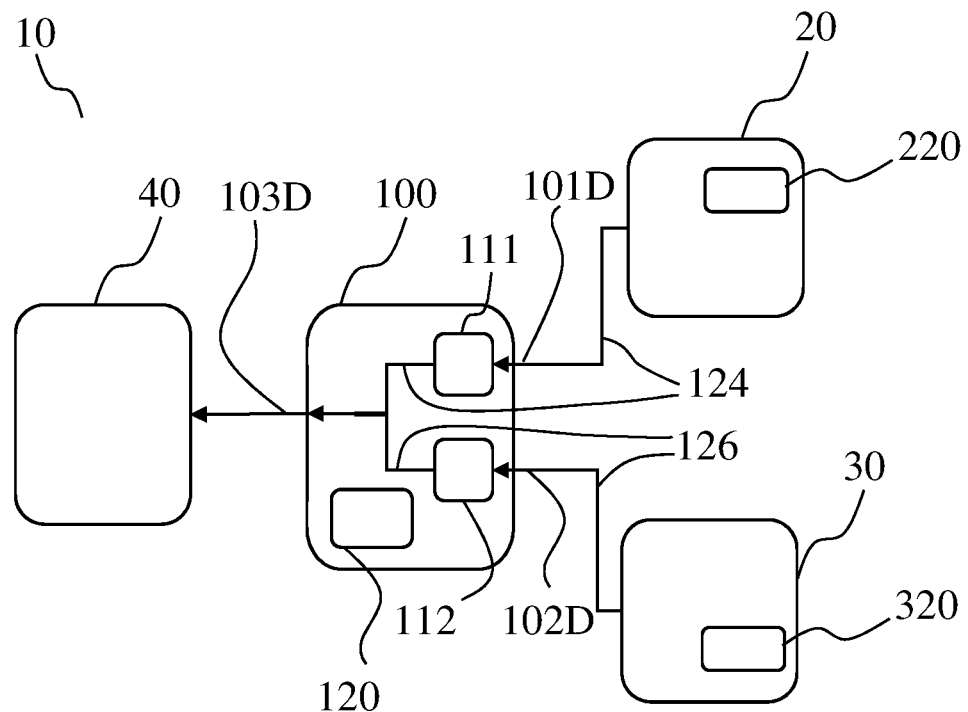
FIG. 2 shows a schematic representation of the electric power system in discharging mode, in accordance with various embodiments.

FIG. 1 shows a schematic representation of the electric power system 10 in charging mode, in accordance with various embodiments. FIG. 2 shows a schematic representation of the electric power system 10 in discharging mode, in accordance with various embodiment. The electric power system 10 illustrated in FIGS. 1 and 2 may include a first battery unit 20 including a first accumulator 220, and a second battery unit 30 including a second accumulator 320. At least one of the first and second battery units 20, 30 may be a swappable battery unit. The electric power system 10 may further include a battery controller 100. The battery controller 100 may include a first charging current path 101C and a first discharging current path 101D connected to the first battery unit 20. The battery controller 100 may further include a second charging current path 102C and a second discharging current path 102D connected to the second battery unit 30.

The battery controller 100 may further include a third charging current path 103C and a third discharging current path 103D for a connection with an electric control system 40 of the electric vehicle 300. A first power switch 111 may be provided between the first discharging current path 101D and the third discharging current path 103D. A second power switch 112 may be provided between the second discharging current path 102D and the third discharging current path 103D. The first power switch 111 and the second power switch 112 may be comprised by the battery controller 100.

In accordance with various embodiments, the third charging current path 103C may conductively couple to the first charging current path 101C and the second charging current path 102C, for example via a metal trace or wire, such as copper. In some embodiments, a path comprising the third charging current path 103C coupled to the first charging current path 101C may be free of switching elements. Further, a path comprising the third charging current path 103C coupled to the second charging current path 102C may be free of switching elements.

The battery controller 100 may further include a controlling unit 120 configured to independently set the first power switch 111 and the second power switch 112. For example, each of the first power switch 111 and the second power switch 112 may be set to open or closed. The first power switch 111 and the second power switch 112 may be set by the controlling unit 120 based on a state of the first accumulator 220 in the first battery unit 20 and/or a state of the second accumulator in the second battery unit 30.

According to various embodiments, the controlling unit 120 may include a logic circuit configured to regulate a charging behavior of the first accumulator 220 and the second accumulator 320.

According to various embodiments, the logic circuit may be configured to, when charging, determine a lower charge state and a higher charge state among the first accumulator 220 and the second accumulator 320. The logic circuit may be further configured to, (i) when charging, send a charge enable command to that battery unit of the first and second battery units having the lower charge state. The logic circuit may be further configured to, (ii) when charging, send a charge enable command to that battery unit of the first and second battery units having the higher charge state, when a difference of the higher charge state and the lower charge state is lower than a pre-determined charging threshold. The charge enable command may enable the respective battery unit to be charged, for example, the charge enable command may put the respective battery unit into charging mode, for example by closing an internal battery unit switch, for example a first internal charging switch or a second internal charging switch. Step (ii) may preferably be carried out after step (i). After step (i), the logic circuit may continuously monitor the difference of the higher charge state and the lower charge state and compare the difference to the pre-determined charging threshold.

Figure 3:
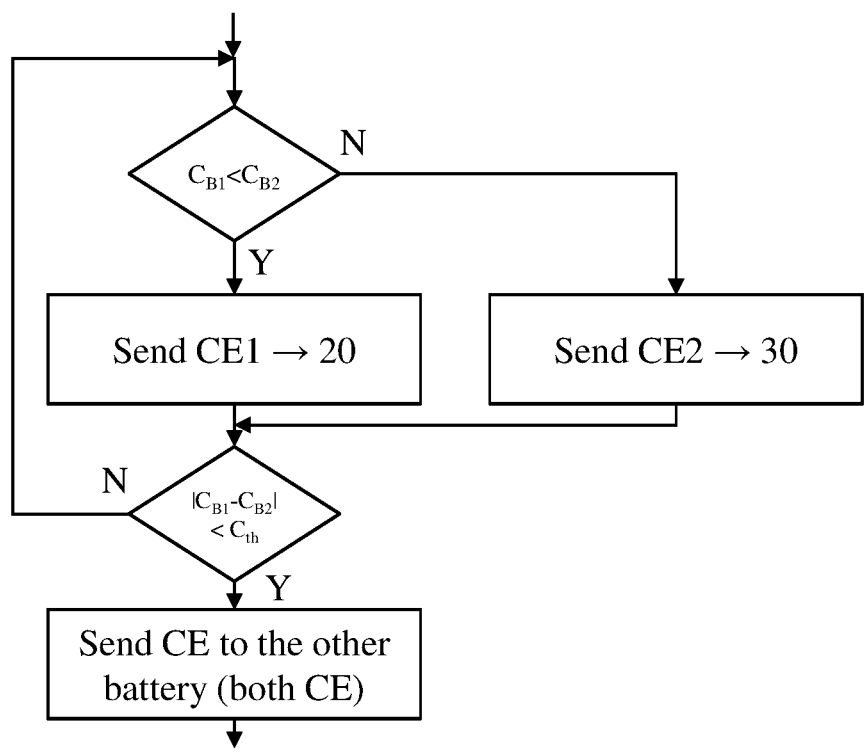
FIG. 3 shows a flow chart of the method of operating the electric power system in charging mode, in accordance with various embodiments.

Turning to FIG. 1 and FIG. 3, it is assumed for illustration purposes, that a charging of the accumulators is desired and therefore, the logic circuit is configured in a charging mode. For explaining the example, it is assumed that the first accumulator 220 has the lower charge ($C_{B1}$) and the second accumulator 320 has the higher charge ($C_{B2}$) (however, it could be the other way around). The logic circuit may determine (($C_{B1}$>$C_{B2}$)?) the lower charge state ($C_{B1}$) and the higher charge state ($C_{B2}$) among the first accumulator 220 and the second accumulator 230, and may further identify the accumulator 220 having the lower charge state ($C_{B1}$). For determining the lower charge state ($C_{B1}$) and the higher charge state ($C_{B2}$), the logic circuit may monitor the charge states ($C_{B1}$, $C_{B2}$) of the first accumulator 220 and the second accumulator 320, for example, continuously. The logic circuit may then send a charge enable command CE1 to the first battery unit 20, which is the unit including the first accumulator 220 (i.e. the accumulator having the lower charge $C_{B1}$). From this time onwards, the first accumulator 220 is charging.

The logic circuit may continue to monitor the charge states ($C_{B1}$, $C_{B2}$) of the first accumulator 220 and the second accumulator 320, for example, continuously. When a difference ($|C_{B1}-C_{B2}|$) of the higher charge state ($C_{B2}$) and the lower charge state ($C_{B1}$) is lower than a pre-determined charging threshold ($C_{th}$), the logic circuit may send a charge enable command CE2 to that battery unit of the first and second battery units having the higher charge state, in this case, to the second battery unit 30, which is the unit including the second accumulator 320. From this time onwards, the first accumulator 220 and the second accumulator 320 are both charging. The process may repeat as long as charging is desired. The charging may proceed until it is completed, or otherwise interrupted, for example, when a charging power supply to the electric power system 10 is interrupted. The flowchart represented in FIG. 3 is for illustration purposes, and it may be implemented differently while still providing the same or similar effects, for example, instead of sending CE2, the logic circuit may send CE1 and CE2, thus reasserting CE1, even if redundant.

Figure 4:
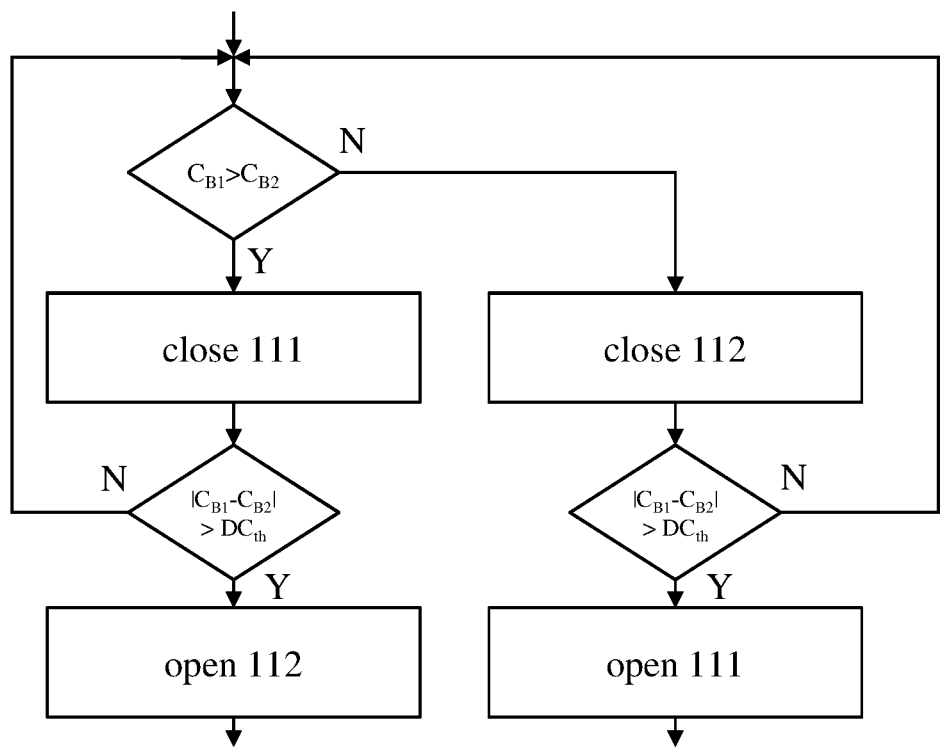
FIG. 4 shows a flow chart of the method of operating the electric power system in discharging mode, in accordance with various embodiments.

Turning to FIG. 2 and FIG. 4, it is assumed for illustration purposes, that a discharging of the accumulators is desired and therefore, the logic circuit is configured in a discharging mode. A discharging mode may be for example, when a load needs to be electrically driven having the battery units as power sources, for example when an electrical motor is engaged to move a vehicle. For explaining the example, it is assumed that the first accumulator 220 has the higher charge ($C_{B1}$) and the second accumulator 320 has the lower charge ($C_{B2}$) (however, it could be the other way around). In some embodiments, in an initial state, both the first power switch 111 and the second power switch 112 may be closed. According to various embodiments, the logic circuit may determine (($C_{B1}$>$C_{B2}$)?) the lower charge state ($C_{B1}$) and the higher charge state ($C_{B2}$) among the first accumulator 220 and the second accumulator 230, and may further identify the accumulator 220 having the higher charge state ($C_{B1}$).

For determining the higher charge state ($C_{B1}$) and the lower charge state ($C_{B2}$), the logic circuit may monitor the charge states ($C_{B1}$, $C_{B2}$) of the first accumulator 220 and the second accumulator 320, for example, continuously. The logic circuit may then close the first power switch 111 for discharging the first accumulator 220 (i.e. the accumulator having the higher charge $C_{B1}$), which is the accumulator included in the first battery unit 20. From this time onwards, the first accumulator 220 is discharging when a load is provided.

The logic circuit may continue to monitor the charge states ($C_{B1}$, $C_{B2}$) of the first accumulator 220 and the second accumulator 320, for example, continuously. When a difference ($|CB_1-C_{B2}|$) of the higher charge state ($C_{B1}$) and the lower charge state ($C_{B2}$) is higher than a pre-determined discharging threshold ($DC_{th}$) the logic circuit may open the one of the first power switch 111 and the second power switch 112 corresponding to the one the first accumulator 220 and the second accumulator 320 having a lower charge state, in this case the second power switch 112. From this time onwards, the first accumulator 220 is discharging and the second accumulator 320 is not discharging. Thus, a discharge imbalance may be avoided. The process may repeat as long as discharging is desired. The flowchart represented in FIG. 4 is for illustration purposes, and it may be implemented differently while still providing the same or similar effects.

In the following an initial situation will be described, wherein a first battery unit 20 is plugged in and thereby connected to the battery controller 100, and second battery unit 30 is plugged in and thereby connected to the battery controller 100, in accordance with various embodiments.

When the first battery unit 20 is plugged in, each of the electric control system 40 and the first battery unit 20 may detect that the battery is in the scooter. The battery unit 20 will open any internal discharging circuit and the battery controller 100 will be powered, for example through a respective diode (see FIG. 5). At this time, the electric control system 40 may still be powered off. After the second battery unit 30 is inserted, the battery controller 100 compares the charge state of the first and the second battery units 20 and 30 and then set the first power switch 111 and the second power switch 112 based on a state of the first accumulator in the first battery unit 20 and/or a state of the second accumulator in the second battery unit 30. Thus, the battery controller 100 decides whether to turn on one or both of the first and second power switches 111 and 112.

After the first battery unit 20 turns on its integrated discharging circuit (for example a first discharging switch), it will attempt to communicate with the battery controller 100. If the communication is normal, it will continue to maintain the output, or if an error occurs, for example a time out error (e.g., if the communication is not established), the battery will turn off the output.

When the second battery unit 30 is plugged in, similarly as explained above for the first battery unit 20, the second battery unit 30 may turn on its discharging circuit (for example a second discharging switch), for example at the same time. In the case that two diodes are provided (see FIG. 5), due to the diodes, the battery controller 100 will be constantly powered on by the voltage supplied by the battery units.

In the following an situation will be described, wherein the first battery unit 20 and the second battery unit 30 are swapped with new battery units (e.g. charged battery units), in accordance with various embodiments.

The electric control system 40 controls the battery controller 100 to turn off the first and the second power switches 111 and 112, thereafter the electric control system 40 may power off. The electric control system 40 may be configured accordingly.

The battery controller 100 may control the first battery unit 20 and the second battery unit 30 to turn off (e.g. open) the first and second discharging switches 211 and 311 (311 is not shown) to stop the output. Now a user may remove the first and the second battery units 20 and 30 from their receptacle.

A user may insert new (e.g. fully charged) first and the second battery units in their receptacle and start the procedure of discharging, then the system will be powered on.

Before the swappable operation, the system will be powered off and the outputs of the battery units are cut off, therefore the operation is safer than other solutions which do not cut off the battery's power.

In the case that the swappable operation is done first by the operator before the whole system is power off, for example, the user removes one of the battery units while the system is still on, the stability of the system could still be guaranteed by the battery controller 100. For example, when the battery controller 100 is powered on, the first and second battery units 20 and 30 are both in normal output condition. If a user or operator pulls out one of the battery units, the battery controller 100 will detect the removal of the battery unit and turn off the respective one of the first and second power switch (111 or 112). According to various embodiments, the battery controller 100 may be configured to detect the removal of the battery unit and turn off the respective one of the first and second power switch (111 or 112)

Each of the first and second battery units 20 and 30 may also detect that they have been pulled out, i.e., disconnected without previously receiving a command to stop discharge, and then turn off the discharge, for example until communication with the battery controller 100 is reestablished. According to various embodiments, each of the first and second battery units 20 and 30 may be configured accordingly.

At this moment, (after the non-conform removal of one of the battery units) the battery controller 100 and electric control system 40 are still powered by the other battery unit. When the other battery unit is also pulled out, the battery controller 100 and the electric control system 40 are powered off. The recently removed battery unit powers itself off as well. Hence, the aforementioned operation procedure will not cause damage to the electric control system 40. And also because the power supply of the battery controller 100 and the electric control system 40 are isolated, in specific situations or for intentional operation, the battery controller 100 can turn off (open) both of the first and second power switches 111 and 112 to power off the electric control system 40. So in this condition, when the vehicle (e.g. electrical scooter) is in stop mode, the battery controller 100 can automatically power off the electric control system 40, while the first battery unit 20 and second battery unit 30 could both keep outputs normally, the whole system can save more power and the safety is enhanced.

According to various embodiments, the logic circuit may be further configured to receive a stop command from the electric control system 40 and, upon receiving the stop command, setting each of the first power switch 111 and the second power switch 112 to open.

With this logic, there is no need to firstly power off the electric control system 40, before the battery swapping operation. Therefore the operation is easier and safer, while also improving the stability of the system.

In the following, a situation will be described, wherein only one of the first and second battery units (20 or 30) are swapped with a new battery unit (e.g. a charged battery unit).

When one of the first and the second battery units 20 and 30 is removed from its receptacle (e.g. disconnected from the battery controller 100), the battery controller 100 will detect the removal and turn off (open) the related power switch (111 or 112), the disconnected battery may cut off its output as well.

In a normal swappable operation, both battery units 20 and 30 should be removed before any new battery unit is inserted. If only one of the first and second battery units (20 or 30) is replaced with a new battery unit (for example a fully charged battery unit), the new battery has a higher charge state than the removed battery and also higher than the charge state of the remaining battery unit (the one that was not removed).

Because of the diodes (see FIG. 5), the power supply of battery controller 100 will be automatically switched to the new battery (of higher power level).

The battery controller 100 will turn off (open) the power switch (111 or 112) related to the remaining battery unit since it has a lower charge state. Afterwards, the battery controller 100 will turn on (close) the other power switch (112 or 111) related to the newly inserted battery unit and complete the process of switching the power supply from the remaining battery unit one to the new battery unit.

According to various embodiments, the electric control system 40 and/or the battery controller 100 may further be configured to detect when one of the first and the second battery units 20 and 30 is disconnected and re-connected (from and to the battery controller 100), and, if the vehicle (e.g. electrical scooter) is in ride mode, to not re-enable discharging of the re-connected battery unit. Not re-enabling may be achieved by keeping the power switch corresponding to the re-connected battery unit open. In some embodiments, the re-connected battery unit may not be re-enabled even if there is a voltage difference between the first and the second battery units 20 and 30. This provides for further safety while operating the vehicle, for example, in ride mode. Once the ride mode is deactivated, the electric control system 40 and/or the battery controller 100 may return to the normal operation mode, for example as described in connection with FIGS. 3 and 4.

Figure 5:
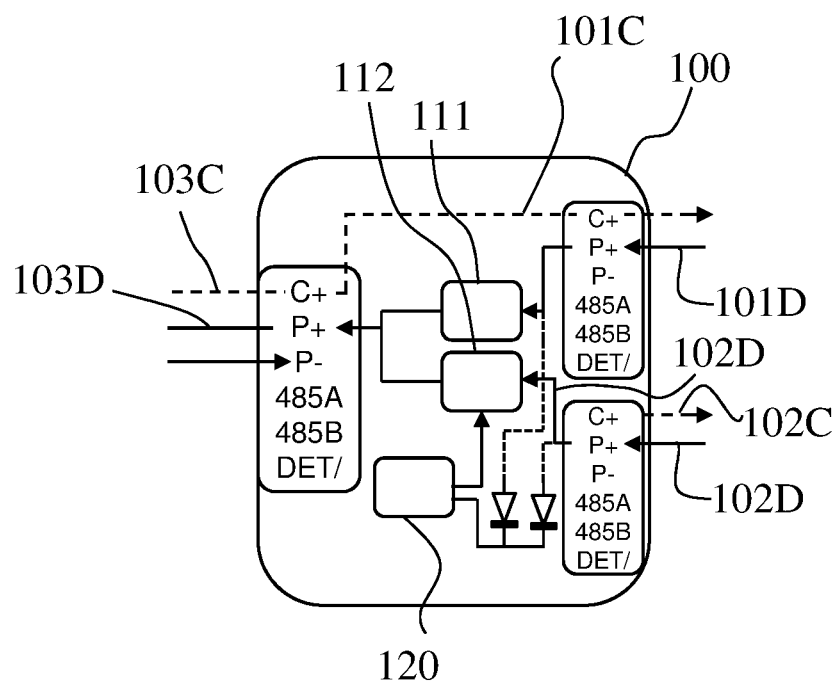
FIG. 5 shows a schematic representation of the battery controller in accordance with various embodiments.

FIG. 5 shows a schematic representation of a battery controller 100 for an electric power system 10 of an electric vehicle in accordance with various embodiments. The battery controller 100 may include a first charging current path 101C and a first discharging current path 101D connectable to the first battery unit 20. The battery controller 100 may further include a second charging current path 102C and a second discharging current path 102D connectable to the second battery unit 30. The battery controller 100 may further include a third charging current path 103C and a third discharging current path 103D for a connection with an electric control system 40 of the electric vehicle 300. The battery controller 100 may further include a first power switch 111 between the first discharging current path 101D and the third discharging current path 103D. The battery controller 100 may further include a second power switch 112 between the second discharging current path 102D and the third discharging current path 103D. The battery controller 100 may further include a controlling unit 120 configured to set the first power switch 111 and the second power switch 112 based on a state of the first accumulator in the first battery unit 20 and/or a state of the second accumulator in the second battery unit 30. The controlling unit may be configured to set first and second internal charging switches of the first and second battery units 20 and 30 and the first and second discharging switches 211 and 311 (311 is not shown) of the first 20 and second battery units 30 (see FIG. 6).

Figure 6:
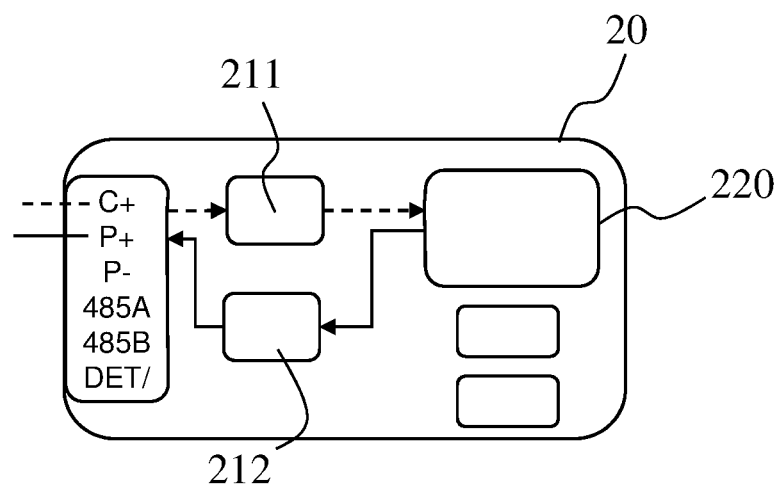
FIG. 6 shows a schematic representation of a battery unit, in accordance with various embodiments.

According to various embodiments, and as illustrated in FIG. 6, the controlling unit 120 may be powered by the first battery unit 20, (e.g. by the first accumulator 220) via the first discharging current path 101D and via a first diode and/or by the second battery unit 30 (e.g. by the second accumulator 230) via the second discharging current path 102D via a second diode. The electrical connections between the discharging current paths and the diodes are represented in short dashed lines for ease of understanding.

According to various embodiments, the first power switch 111 and/or the second power switch 112 are solid state switches, optionally MOS transistors.

FIG. 6 shows a schematic representation of a battery unit, each of the first and second battery units 20 and 30 may be identical or may be different from each other. In one example, embodiment both battery units 20 and 30 have a same nominal capacity. According to various embodiments, each of the first battery 20 and the second battery 30 may be a swappable battery unit. For example, both of the first battery unit 20 and the second battery unit 30 may be swappable battery units. The first battery unit 20 has a connector, represented for illustration purposes as having terminals C+, P+, P−, 485A, 485B, and DET. The C+ terminal is a charging terminal. The P+ and P− terminals are the positive and the negative power terminals. DET represents a detection line. The 485A and 485B are communication terminals, for example for the RS-485, however the disclosure is not limited thereto and other physical layers and/or communication protocols may be used. The controlling unit 120 may have connectors (see FIG. 5) compatible with the connectors of the battery units 20 and 30.

The controlling unit 120 may have a connector with similar terminals as aforementioned, for connection with the electric control system 40 of the vehicle. However, the connectors may be different from the ones represented and may be different from each other. In some embodiments, all 3 connectors of the controlling unit 120 have the same kind of terminals. This allows the controlling unit 120 to be inserted in an existing system, for example wherein the electric control system 40 was previously directly connected to the battery units 20 and 30.

In some embodiments, the first battery unit 20 may include a first internal charging switch 211 between the first accumulator 220 and the first charging current path 101C, and may include a first internal discharging switch 212 between the first accumulator 220 an the first discharging path 101D. Further, the second battery unit 30 may include a second internal charging switch between the second accumulator and the second charging current path, and may include a second internal discharging switch between the second accumulator an the second discharging path. The controlling unit 120 may be configured to set the first and second internal charging switches and the first and second discharging switches of the first and second battery units, for example as closed to enable discharging or as open to disable discharging of the respective accumulator.

Figure 7:
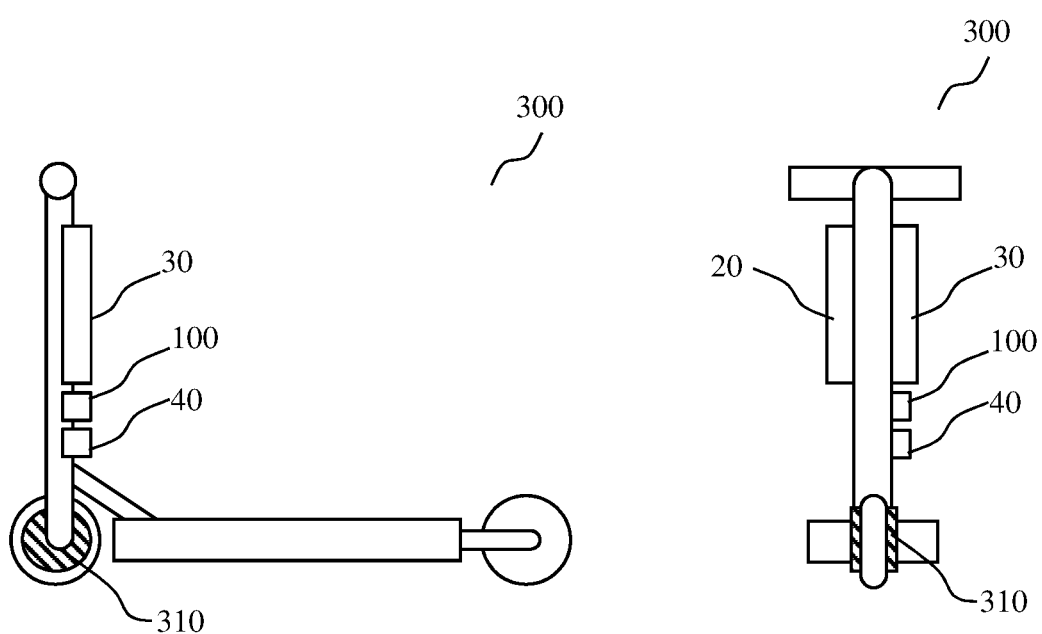
FIG. 7 shows a schematic representation of an electric scooter, in accordance with various embodiments.

An aspect of the disclosure concerns an electric vehicle 300 including the electric power system 10 including the electric control system 40, the battery controller 100, and may further include receptacle(s) for the first and/or the second battery units 20 and 30. The electric vehicle 300 may further include the first and/or the second battery units 20 and 30, in accordance with various embodiments. An example of such a vehicle is illustrate in FIG. 7. The electric vehicle 300 may include an electric motor electrically coupled to the electric control system 40. For example, the electric vehicle 300 may be an electric scooter.

The invention claimed is:

1. An electric power system for an electric vehicle, comprising:
    a first battery unit including a first accumulator, and
    a second battery unit including a second accumulator,
    a battery controller comprising
    a first charging current path and a first discharging current path connected to the first battery unit,
    a second charging current path and a second discharging current path connected to the second battery unit,
    a third charging current path and a third discharging current path for a connection with an electric control system of the vehicle,
    a first power switch between the first discharging current path and the third discharging current path,
    a second power switch between the second discharging current path and the third discharging current path, and
    a controlling unit configured to set the first power switch and the second power switch based on a state of the first accumulator in the first battery unit and/or a state of the second accumulator in the second battery unit, and
    wherein at least one of the first and second battery units is a swappable battery unit, and
    wherein the controlling unit is powered via the first discharging current path via a first diode and/or via the second discharging current path via a second diode.

2. The electric power system of claim 1, wherein the controlling unit comprises a logic circuit configured to regulate a charging behavior of the first accumulator and the second accumulator.

3. The electric power system of claim 2, wherein the logic circuit is configured to, when charging:
    determine a lower charge state and a higher charge state among the first accumulator and the second accumulator;
    send a charge enable command to that battery unit of the first and second battery units having the lower charge state; send a charge enable command to that battery unit of the first and second battery units having the higher charge state, when a difference of the higher charge state and the lower charge state is lower than a pre-determined charging threshold.

4. The electric power system of claim 1, wherein the controlling unit is configured to, when discharging:
    determine a lower charge state and a higher charge state among the first accumulator and the second accumulator;
    close the one of the first power switch and the second power switch corresponding to the one of the first accumulator and the second accumulator having the higher charge state;
    open the one of the first power switch and the second power switch for interrupting a discharge of that accumulator of the first and the second accumulators having the lower charge state when a difference of the higher charge state and the lower charge state is higher than a pre-determined discharging threshold.

5. The electric power system of claim 2, wherein the logic circuit is further configured to receive a stop command from the electric control system and, upon receiving the stop command, setting each of the first power switch and the second power switch to open.

6. The electric power system of claim 1, wherein the first power switch and/or the second power switch are solid state switches.

7. The electric power system of claim 1, wherein each of the first battery unit and the second battery unit is a swappable battery unit.

8. The electric power system of claim 1, wherein the first battery unit includes a first internal charging switch between the first accumulator and the first charging current path, and includes a first internal discharging switch between the first accumulator and the first discharging current path, and
    wherein the second battery unit includes a second internal charging switch between the second accumulator and the second charging current path, and includes a second internal discharging switch between the second accumulator and the second discharging current path, and
    wherein the controlling unit is configured to set the first and second internal charging switches and/or the first and second internal discharging switches of the first and second battery units.

9. The electric power system of claim 1, wherein the controlling unit is configured to set first and second internal charging switches of the first and second battery units and first and second internal discharging switches of the first and second battery units.

10. The electric power system of claim 9, wherein the controlling unit comprises a logic circuit configured to regulate a charging behavior of the first accumulator and the second accumulator.

11. The electric power system of claim 10, wherein the logic circuit is configured to, when charging:
    determine a lower charge state and a higher charge state among the first accumulator and the second accumulator;
    send a charge enable command to that battery unit of the first and second battery units having the lower charge state;
    send a charge enable command to that battery unit of the first and second battery units having the higher charge state, when a difference of the higher charge state and the lower charge state is lower than a pre-determined charging threshold.

12. The electric power system of claim 9, wherein the controlling unit is configured to, when discharging:
    determine a lower charge state and a higher charge state among the first accumulator and the second accumulator;
    close the one of the first power switch and the second power switch corresponding to the one of the first accumulator and the second accumulator having the higher charge state;
    open the one of the first power switch and the second power switch for interrupting a discharge of that accumulator of the first and the second accumulators having the lower charge state when a difference of the higher charge state and the lower charge state is higher than a pre-determined discharging threshold.

13. The electric power system of claim 10, wherein the logic circuit is further configured to receive a stop command from the electric control system and, upon receiving the stop command, setting each of the first power switch and the second power switch to open.

14. The electric power system of claim 9, wherein the first power switch and/or the second power switch are solid state switches, optionally MOS transistors.

15. An electric power system for an electric vehicle, comprising:

a first battery unit including a first accumulator, and
a second battery unit including a second accumulator,
a battery controller comprising
a first charging current path and a first discharging current path connected to the first battery unit,
a second charging current path and a second discharging current path connected to the second battery unit,
a third charging current path and a third discharging current path for a connection with an electric control system of the vehicle,
a first power switch between the first discharging current path and the third discharging current path,
a second power switch between the second discharging current path and the third discharging current path, and
a controlling unit configured to set the first power switch and the second power switch based on a state of the first accumulator in the first battery unit and/or a state of the second accumulator in the second battery unit, and
wherein at least one of the first and second battery units is a swappable battery unit,
wherein the first battery unit includes a first internal charging switch between the first accumulator and the first charging current path, and includes a first internal discharging switch between the first accumulator and the first discharging current path,
wherein the second battery unit includes a second internal charging switch between the second accumulator and the second charging current path, and includes a second internal discharging switch between the second accumulator and the second discharging current path, and
wherein the controlling unit is configured to set the first and second internal charging switches and/or the first and second internal discharging switches of the first and second battery units.

16. The electric power system of claim 15, wherein the controlling unit comprises a logic circuit configured to regulate a charging behavior of the first accumulator and the second accumulator.

17. The electric power system of claim 16, wherein the logic circuit is configured to, when charging:
   determine a lower charge state and a higher charge state among the first accumulator and the second accumulator;
   send a charge enable command to that battery unit of the first and second battery units having the lower charge state;
   send a charge enable command to that battery unit of the first and second battery units having the higher charge state, when a difference of the higher charge state and the lower charge state is lower than a pre-determined charging threshold.

18. The electric power system of claim 15, wherein the controlling unit is configured to, when discharging:
   determine a lower charge state and a higher charge state among the first accumulator and the second accumulator;
   close the one of the first power switch and the second power switch corresponding to the one of the first accumulator and the second accumulator having the higher charge state;
   open the one of the first power switch and the second power switch for interrupting a discharge of that accumulator of the first and the second accumulators having the lower charge state when a difference of the higher charge state and the lower charge state is higher than a pre-determined discharging threshold.

19. The electric power system of claim 16, wherein the logic circuit is further configured to receive a stop command from the electric control system and, upon receiving the stop command, setting each of the first power switch and the second power switch to open.

20. The electric power system of claim 15, wherein the first power switch and/or the second power switch are solid state switches.

* * * * *